United States Patent [19]
Rajan et al.

[11] Patent Number: 5,635,063
[45] Date of Patent: Jun. 3, 1997

[54] WATER TREATMENT APPARATUS

[76] Inventors: Rajan G. Rajan; Mathu Rajan, both of 10136 Bemis Rd., Willis, Mich. 48191

[21] Appl. No.: 311,943

[22] Filed: Sep. 26, 1994

[51] Int. Cl.⁶ ........................................ B01D 24/12
[52] U.S. Cl. ...................... 210/266; 210/282; 210/283; 210/284; 210/290
[58] Field of Search ........................ 210/266, 282, 210/283, 284, 285, 286, 287, 288, 289, 290, 455, 464, 465, 466, 467, 468, 469, 473, 474, 475, 476, 477, 501, 502.1

[56] References Cited

U.S. PATENT DOCUMENTS

| | | | |
|---|---|---|---|
| 260,106 | 6/1882 | Long | 210/335 |
| 533,136 | 1/1895 | Miller | 210/335 |
| 1,730,581 | 10/1929 | McMachen et al. | 210/284 |
| 2,087,442 | 7/1937 | Nack | 210/283 |
| 2,334,802 | 9/1943 | Zuckermann | 210/335 |
| 3,319,791 | 5/1967 | Horne | 210/266 |
| 3,342,340 | 9/1967 | Shindell | 210/283 |
| 4,198,296 | 4/1980 | Doumas et al. | 210/501 |
| 4,264,451 | 4/1981 | Pope et al. | 210/721 |
| 4,368,123 | 1/1983 | Stanley | 210/269 |
| 4,382,862 | 5/1983 | Dillman | 210/668 |
| 4,430,226 | 2/1984 | Hedge et al. | 210/669 |
| 4,606,823 | 8/1986 | Lucas, III | 210/282 |
| 4,749,481 | 6/1988 | Wheatley | 210/282 |
| 4,769,143 | 9/1988 | Deutsch et al. | 210/266 |
| 4,800,018 | 1/1989 | Moser | 210/266 |
| 4,894,154 | 1/1990 | Roz et al. | 210/282 |
| 4,913,808 | 4/1990 | Hague | 210/282 |
| 4,944,875 | 7/1990 | Gaignet | 210/232 |
| 4,995,976 | 2/1991 | Vermes et al. | 210/282 |
| 4,999,109 | 3/1991 | Sabre | 210/282 |
| 5,061,367 | 10/1991 | Hatch et al. | 210/137 |
| 5,064,534 | 11/1991 | Busch et al. | 210/266 |
| 5,078,874 | 1/1992 | Sullivan | 210/286 |
| 5,110,479 | 5/1992 | Frommer et al. | 210/282 |
| 5,126,044 | 6/1992 | Magnusson et al. | 210/290 |
| 5,190,643 | 3/1993 | Duncan et al. | 210/282 |
| 5,205,932 | 4/1993 | Solomon et al. | 210/283 |
| 5,211,973 | 5/1993 | Nohren, Jr. | 210/283 |
| 5,215,657 | 6/1993 | Goldfield et al. | 210/284 |
| 5,240,620 | 8/1993 | Shalev | 210/282 |
| 5,269,919 | 12/1993 | von Medlin | 210/266 |
| 5,271,837 | 12/1993 | Discepolo et al. | 210/283 |
| 5,273,649 | 12/1993 | Magnusson et al. | 210/282 |
| 5,308,482 | 5/1994 | Mead | 210/477 |
| 5,338,458 | 8/1994 | Carrubba et al. | 210/668 |
| 5,401,399 | 3/1995 | Magnussen et al. | 210/282 |
| 5,407,573 | 4/1995 | Hughes | 210/266 |
| 5,427,683 | 6/1995 | Gershon et al. | 210/283 |

*Primary Examiner*—Cynthia L. Nessler
*Attorney, Agent, or Firm*—Weintraub DuRoss & Brady

[57] ABSTRACT

Water treatment apparatus includes a two-piece housing and a stack of discrete filtering layers disposed within the housing including a layer of silver impregnated carbon, a layer of pentavalent iodine impregnated resins and at least one layer of a mixed bed activated resin. The apparatus is designed so that no water pressure need be applied to force the water through the apparatus, as gravity pulls the water down through the filtering layers.

2 Claims, 2 Drawing Sheets

U.S. Patent            Jun. 3, 1997            Sheet 1 of 2            5,635,063
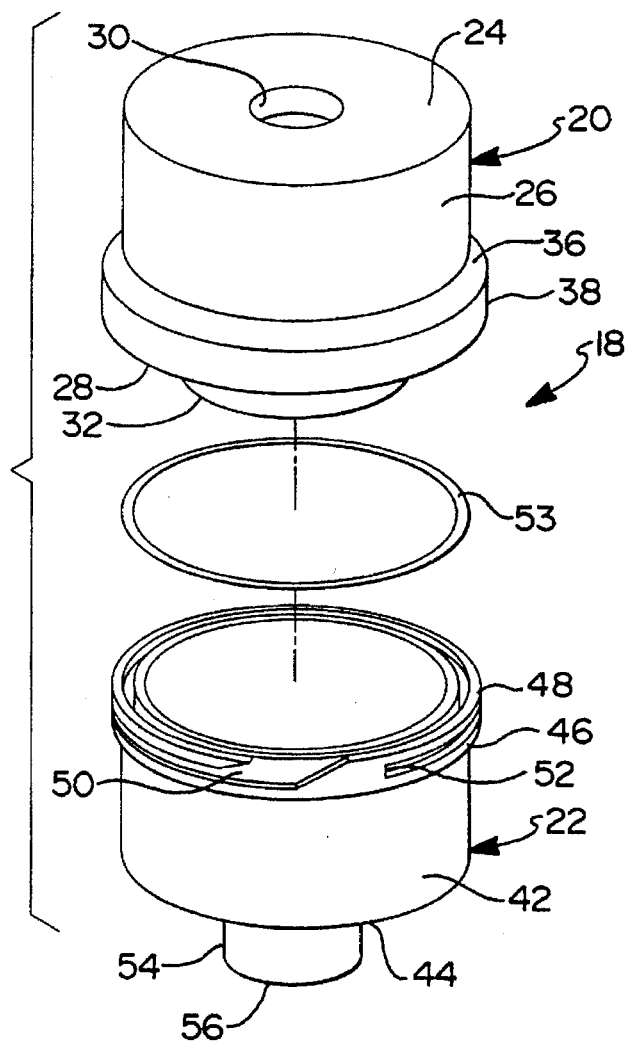
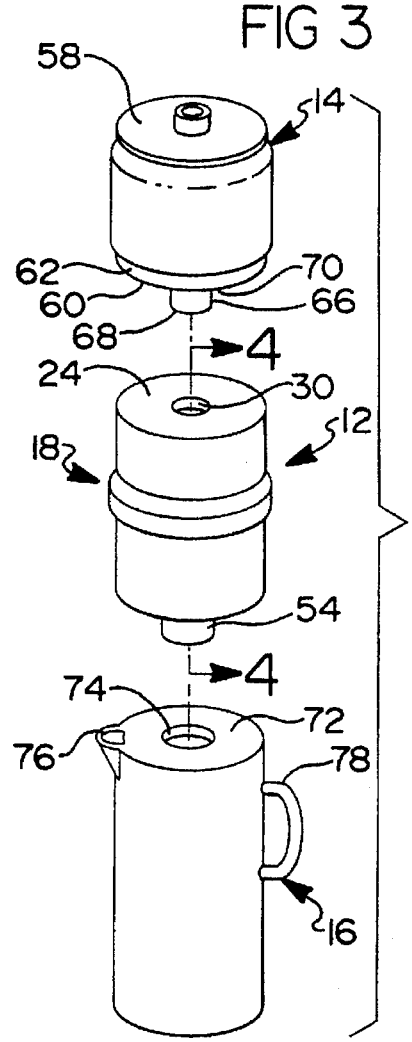

WATER TREATMENT APPARATUS

BACKGROUND OF THE INVENTION

I. Field of the Invention

The present invention relates to a water treatment apparatus. More particularly, the present invention relates to a multi-stage water treatment apparatus. Even more particularly, the present invention relates to a multi-stage water treatment apparatus for producing potable water.

II. Prior Art

Much of the public concern about the quality of drinking water centers on how the water looks, tastes or smells. Unfortunately, water that looks, tastes and smells just fine may pose severe health hazards. For example, at least 42,000,000 Americans are exposed to dangerous amounts of lead in their drinking water. Thus, more than one hundred contaminants are now subject to water-safety regulations.

Many devices currently exist for filtering water to remove contaminants. They all work with different degrees of efficiency to eliminate undesirable particles, substances and living organisms from the water being filtered. Many of these devices, however, utilize the relatively high pressure available from the tap water supply. This necessarily rushes water through the filtering media, preventing the efficient filtering function for which the device was designed. Typically, the designer's concern for efficient filtering of the water is compromised with through put considerations.

Still other water purification systems have been developed that do not use the water pressure supplied from a tap, but utilize gravity for effecting water throughput. One such system known to applicants is sold by Water Technologies, Inc., Plymouth, Minn.

This system, particularly, includes a granulated active carbon bed and a coaxially aligned resin bed of equal cross-sectional flow area containing polystyrene beads to which are bonded iodine molecules. This resin, which is described in U.S. Pat. No. 4,238,477, has proven effective in destroying the viral, bacterial and parasitic contaminants when deposited to a bed depth sufficient to provide proper contact time between the resin and water. Although effective in practice, the foregoing system has proven to be economically expensive to produce, due to the use of excessive amounts of resin. That is, the resin bed portion of the system has been constructed oversize, relative to the life of the granulated active carbon bed, in lieu of adjusting the cartridge housing configuration.

U.S. Pat. No. 5,126,044 granted to Magnusson et alia in 1992 discloses a water purification system similar to that produced by Water Technologies, Inc. However, instead of using excessive amounts of resin, Magnusson teaches lengthening the volume of iodine purification resin material, while still maintaining proper contact time between the resin and water. In essence, by increasing the length of the filtering apparatus, the water maintained contact with the iodine impregnated resin for a longer period of time, effecting assured removal of undesired contaminants.

Other problems exist with the presently known water purification systems. First, most water, especially tap water, has trace amounts of chlorine. Chlorine inhibits the effectiveness of the iodine in the previously disclosed devices, thus, significantly shortening the life of the device. Additionally, the devices tend to be designed for removing specific contaminants from water.

Consequently, there currently exists the need for a filter that can remove a broad scope of contaminants. A filtration device which uses smaller volumes of purification media and has a longer life of usefulness is additionally needed. It is to this which the present invention is directed.

SUMMARY OF THE INVENTION

The present invention provides a water treatment apparatus which removes a broad range of contamanants and which may be either gravity fed or have water under pressure passing therethrough. The appartus hereof, generally, comprises:

a housing having a housing cavity, a housing inlet and outlet;

(b) plurality of distinct particulate layers disposed within the housing cavity, the plurality of particulate layers collectively terminating and removing organic, inorganic, radiological and microbiological contaminants;

(c) at least one porous separator separating each of the plurality of distinct particulate layers from each other, the at least one porous separator removing impurities from water and regulating water flow through each of the plurality of distinct particulate layers;

and wherein water flows into the housing at the housing inlet, through each of the plurality of distinct particulate layers, through at least one porous separator, and exits as potable water through the housing outlet.

A preferred embodiment of the claimed invention presents a water treatment apparatus that kills microbiological contaminants such as bacteria, viruses, cysts and removes inorganic contaminants such as lead, iron, cadmium, aluminum, zinc, mercury, etc. Additionally, the water treatment apparatus removes contaminants such as chlorides, nitrites, pesticides, sulfites, thalomethanes and radioactive substances such as radon, etc. from water.

In a particularly preferred embodiment hereof, the water treatment apparatus includes two substantially cylindrical housing portions that threadably interlock to form a single housing. The first housing portion has a top surface having a centrally located aperture serving as a housing inlet. The bottom surface includes a downwardly extending recess having a plurality of holes formed therethrough. The recess is, preferably, coaxial with the housing inlet and has a smaller diameter than the remainder of the first housing portion, thereby creating a dwell time in the first portion. Also the multi-apertured recess ensures that all water passing through the housing inlet passes out of the first housing portion through the holes in the recess into the second housing portion.

The second housing portion has an open top, side walls and a bottom surface. The bottom surface of the second housing portion has a centrally located aperture formed therein. A spout surrounds the aperture forming a housing outlet. Several layers of water treatment media, filtering media, and water flow control media are disposed within each housing portion.

The water treatment media contained within the housing includes silver impregnated activated carbon, which removes chlorine from the water. The silver in the carbon functions to arrest the growth of bacteria within the carbon, as carbon generally promotes the growth of bacteria.

Another dicrete layer of water treatment media in the housing is pentavalent iodine impregnated resin. This layer is disposed below the layer of silver impregnated activated carbon, because the carbon layer removes chlorine from the water. Chlorine reduces the functionality of the pentavalent iodine. Finally, one or more layers of ionic exchange mixed bed resins remove inorganic contaminants such as lead, iron, cadmium, aluminum, zinc, mercury, etc., as well as other contaminants such as chlorides, nitrites, pesticides, sulfites, thalomethanes and radioactive substances such as radon, etc.

Water flows in through the housing inlet, passes through the water treatment media, the filtering media, and the water flow control media, eventually passing out of the housing via the housing outlet.

The present invention will be more clearly understood with reference to the accompanying drawing. Throughout the figure like reference numerals refer to like parts in which:

BRIEF DESCRIPTION OF THE DRAWINGS

FIG. 1 is an exploded view of a water treatment apparatus in accord with the present invention;

FIG. 2 is a side view of a second housing portion of a water treatment apparatus in accordance herewith;

FIG. 3 is an environmental view of the water treatment apparatus hereof; and

DETAILED DESCRIPTION OF THE PREFERRED EMBODIMENT

Figure 4:
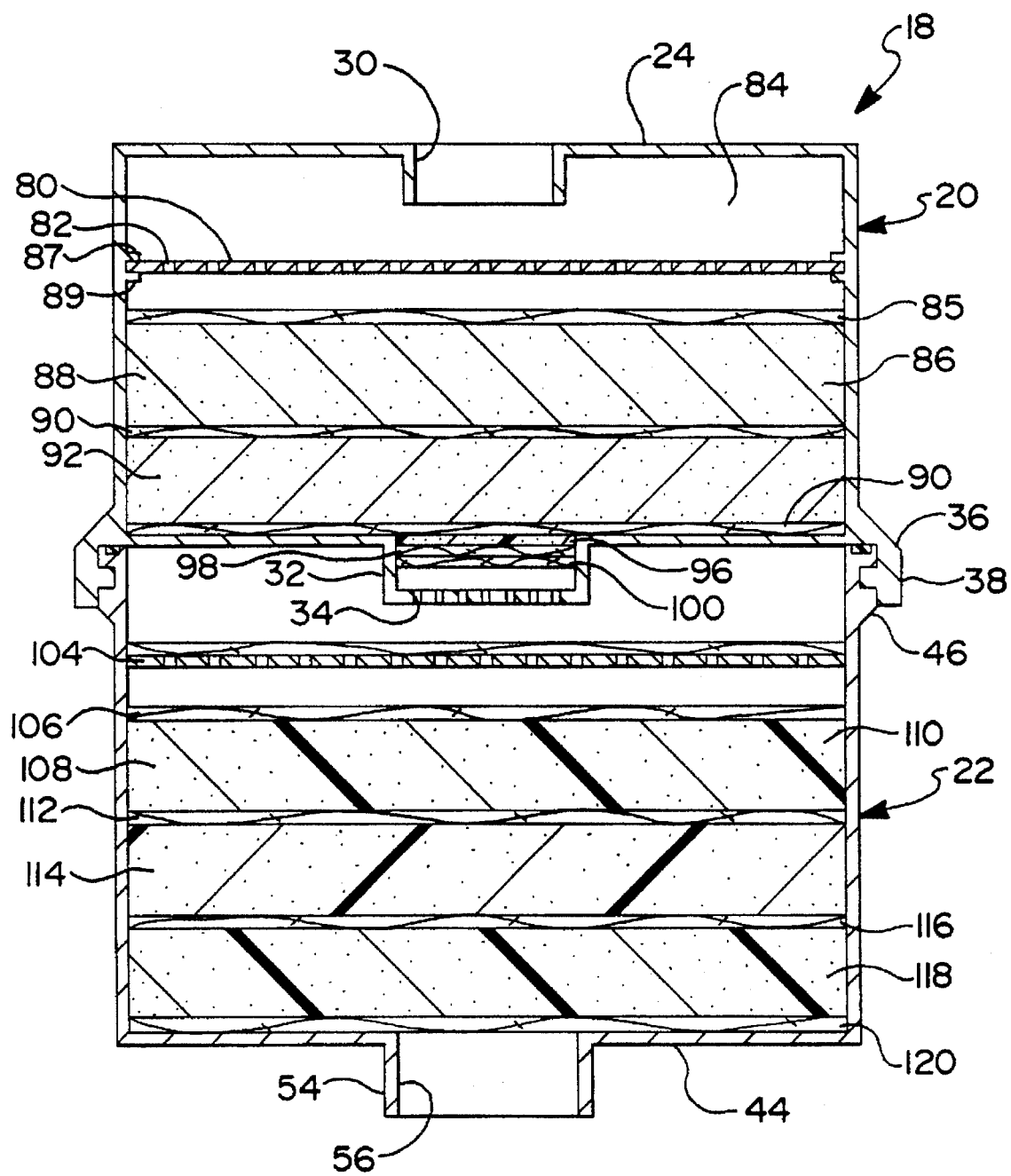
FIG. 4 is a cross-sectional view of the water treatment apparatus of FIG. 1 taken along line 4—4 thereof.

Referring now to FIGS. 1 and 2, there is depicted therein a preferred embodiment of the present invention generally, depicted at 12, which functions in conjunction with a water supply tank 14 and a water collection tank 16

The water treatment apparatus 12 includes a generally cylindrical housing 18. The housing, preferably, comprises a first housing portion 20 and a second housing portion 22. The first housing portion 20 has a top surface 24, a side wall 26 and a bottom surface 28, all of which are sealed together, the housing portion is formed from water impermeable material.

The top surface 24 has a centrally located aperture serving as a housing inlet 30. The bottom surface 28 of the first housing portion 20 includes a recess 32 having plurality of small apertures 34 formed therethrough. The recess 32 has a diameter substantially less than that of the housing. Because of the reduced diameter there is a long dwell time in the first housing portion. Thus, it is to be appreciated that the holes cooperate with the reduced diameter to define means for providing a long dwell time. This ensures that all water passing through the housing inlet 30 passes out of the first housing portion 20 by flowing through the holes 34 and into the second housing portion 22.

The first housing portion 20 is provided with a flared skirt 36 having a cylindrical extension 38. At spaced points on the inner surface of the extension 38, oppositely disposed tabs 40 project inwardly.

The second housing portion 22 has an open top and includes a side wall 42 and a bottom surface 44. The side wall 42 is provided on its outer surface with an axially extended shoulder 46. Above the shoulder 46, the side wall 42 is provided with a thread 48 which is provided with a tapered entrance end 50 and terminates in a shoulder 52. An O-ring 53 radially extends about the second housing portion 22 at its upper end 55 and is attached to the second housing portion 22 by adhesive or other binding means know to the skilled artisan. The O-ring 53 prevents water leaking from the water treatment apparatus 12. The bottom surface 44 of the second housing portion 22 includes a downwardly extending spout 54. The spout 54 defines the housing outlet 56.

The first housing portion 20 is mounted atop the second housing portion 22. The first and second housing portions 20, 22 interlock and cooperate to form the housing 18. The recess 32 projects into the interior of the second member 22, as shown.

The opposed tabs 40 of the first housing portion 20 are adapted to be received by the thread 48 when the second housing portions 22 is axially rotated to cause the tabs 40 to mesh with the thread and detachably assemble the second housing portion 22 with the first housing portion 20. One of the tabs 40 engages with the shoulder 52 to limit turning movement of the second housing portion 22 on the first housing portion 20 when assembling the parts to form the housing 18.

The first housing portion 20 and the second housing portion 22 may be interlocked by other means well known by the skilled artisan including internal threading similar to the external threading shown, or by clamps, screws, or other well known interlocking mechanisms.

Disposed within each of the housing portions 20, 22 is a plurality of discrete particulate layers. Each layer cooperates to help rid water of impurities such as bacteria, heavy metals, chlorine, etc. At least one of the plurality of distinct particulate layers in the first housing member defines means for killing microbes. Each of the plurality of distinct particulate layers in the second housing member defines means for removing organic, inorganic, and radiological contaminants. The specific constituents of the discrete particulate layers, their function and their relative positioning within the housing 18 will be discussed further.

As shown in FIG. 3 the water supply tank 14 seats atop the top surface 24 of the housing 18. The tank 14 includes a removable top 58 and a bottom surface 60. The removable top 58 is removed for filling the tank 14 with water. A downwardly extending annular shoulder 62 is attached to the water supply tank 14 at its bottom surface 60. The shoulder 62 circumferentially fits about the cylindrical housing 18 at its upper end and helps to retain the water supply tank 14 atop the cylindrical housing 18.

The bottom surface 60 of the water supply tank 14 includes a centrally located aperture (not shown) formed therethrough. A downwardly extending spout 66 depends from the bottom surface 60 of the water supply tank 14 and cooperates with the aperture 64 to form a channel 68 for conveying water into the housing.

When the water supply tank 14 is seated upon the top surface 24 of the housing 18, the spout 66 slidably fits into the housing inlet 30 at the top surface 24 of the housing 18. An O-ring seal 70 circumferentially fits about the spout 66 to seal any possible gaps between the spout 66 of the water supply tank 14 and the housing inlet 30 of the housing 18. The O-ring seal 70 ensures that no water leaks therepast as it flows into the housing 18.

The water collection tank 16 includes a top surface 72 having a centrally located aperture 74 therethrough for receiving the downwardly extending spout 54 of the water treatment apparatus 12. The water treatment apparatus 12 sits atop the water collection tank 16. The spout 54 of the water treatment apparatus has an O-ring annularly surrounding its periphery for sealing the interconnection between the spout and the aperture 74.

Water flows from the water supply tank 14 through the water treatment apparatus 12 and is collected in the water collection tank 16. The water collection tank 16 additionally serves as a pitcher, for pouring the water, as the water collection tank 16 includes a spout 76 and handle 78.

FIG. 4 depicts the various distinct layers within the housing 18 of the water treatment apparatus 12. Each of the layers has a diameter substantially equal to the diameter of the housing ensuring water flows through each of the layers and does not leak in any space between the housing and the respective layer. The first housing portion 20 of the housing, which serves as the top of the housing 18, includes a topmost layer comprising a separator, member, such as a plastic disk 80 having a multiplicity of holes 82 formed therethrough. The holes are evenly distributed on the disk and control the flow of water through the apparatus 12. The disk 80 functions to disperse water flowing in through the housing inlet 30 and to reduce the flow rate of the water through the treatment apparatus 12. The disk 80 is seated between two radially inwardly directed shoulders 87, 89 which hold the disc 80 in place. The disc 80 has a diameter substantially equal to that of the first housing portion 20 ensuring water flows through the plurality of holes 82 formed through the disc 80. It is vital to the function of the water treatment apparatus 12 that water flowing through each of the layers will be dispersed and permeate through each layer. This helps to increase the life of the water treatment apparatus, generally, by causing water to flow throughout each layer, instead of forming channels within each layer, reducing the life of an individual layer and, thusly, the life of the water treatment apparatus.

The plastic disk 80 is located a distance from the top surface 24 of the first housing member 20. This provides a small reservoir area 84 within the first housing member for holding water received through the housing inlet 30 and helps prevent water backing up into the water supply tank 14.

Disposed below the plastic disk 80 is a first separator preferably, comprising a filter paper 85. The first filter paper 85 filters large impurities in the water which may be trapped by the filter paper 85. Additionally, the first filter paper 85 serves to help distribute the water within the first housing member 20, in the same manner as noted above. Any type of filter paper may be used herein and includes felt filter paper nylon filter paper, and other filter paper known to the skilled artisan. All of the filter paper referred to herein may be one of these types of filter paper. Additionally, each piece of filter paper serves to slow the progress of water through the water treatment apparatus 12 and has a diameter substantially equal to that of the housing ensuring water does not leak around the edges of the filter paper. Some pieces of filter paper may be thicker or thinner, depending upon the flow rate required to achieve sufficient contact time between the water and the discrete layer disposed above the filter paper.

Beneath the first filter paper 85 is a layer of silver impregnated, activated carbon 86. The silver-impregnated activated carbon 86 primarily serves to remove chlorine from water passing therethrough. The silver blocks the growth of bacteria within the activated carbon layer 86. If bacteria were to grow in the activated carbon layer 86, the water treatment apparatus 12 would function inefficiently. Silver impregnated activated carbon is a well-known and commercially-available product, such as that sold by Ionics, Inc.

Beneath the silver impregnated activated carbon layer 86, a second filter paper 90 is disposed which aides in distributing water flow and filters out any silver or carbon particulates which become entrained in the water. As shown, a layer of catalytic carbon 92 is disposed below the second filter paper 90. This layer filters out any remaining chlorine in the water. The catalytic carbon 92 layer, also, removes any chloromethane, which is a source of unpleasant odor in water. Catalytic carbon is, also, a commercially available product, such as this sold by the Calgon Corporation.

Below the layer of catalytic carbon 92 is disposed a third filter paper 94. The third filter paper 94 serves further to distribute water within the first housing member 20 of the water purification apparatus 14. Additionally, the third filter paper 94 serves to filter out any impurities that may have passed through the first filter paper 85 or the second filter paper 90. Below the third filter paper 94 is a layer of pentavalent iodine impregnated resin 96. Pentavalent iodine impregnated resin is a commercially available product, such as that manufactured by Rohm and Haas, Inc. The abovementioned activated carbon layer 86 and the catalytic carbon layer 92 are disposed in such a manner in the housing as to remove cholorine prior to the watercontacting the iodine layer because chlorine blocks the effectiveness of pentavalent iodine. Pentavalent iodine kills micro-bacteriological contaminants including bacteria, viruses and cysts. If the pentavalent iodine impregnated resin 96 did not kill microbacteriological contaminants, the treatment member 12 would fail to function appropriately as live microbacteriological contaminants might pass through the apparatus, remaining in the water.

The layer of pentavalent iodine impregnated resin 96 is located proximate the recessed surface 32 of the first housing member 20. This is done to ensure that all water passing through the water purification apparatus 12 passes through the layer of pentavalent iodine impregnated resin 96. Additionally, the small diameter of the recess 32 and the size of the apertures 34 slows the flow of water therethrough, ensuring sufficient contact time between the water and the layer of pentavalent iodine impregnated resin 96 to kill all microbiological contaminants.

Below the layer of pentavalent iodine impregnated resin 96 are disposed two filter papers 98, 100, both of which function to reduce the flow rate of water through the layer of pentavalent iodine impregnated resin 96 and, further, to help distribute the flow of water. After traversing the papers 98, 100, the water traverses a fourth layer 122 comprising a mixed bed of cation and anion resins. after traversing the fourth layer of resins, the water then passes through the apertures 84 formed in the recess 32 at the bottom surface 28 of the first housing member 20 and into the second housing member 22.

Water flows through the first housing member 20 more slowly than through the second housing member 22 so there is little chance water will back up through the treatment member 12.

In the second housing member 22, water flows first through a sixth filter paper 102 which serves to distribute the flow of water through the layer below it. Below the sixth filter paper 102 is a second plastic disk 104 which is substantially similar to the plastic disk 80 located in the first housing member 20. The second plastic disk 104 serves to help distribute water and regulate the flow of water through the second housing portion 22, substantially serving to slow the flow of water through the housing 18. Additionally, the second disc 104 is seated between two radially inwardly directed shoulders 107, 109 which hold the disk in place. Other means for holding the discs 80, 104 in place are well known to the skilled artisan and include glue or caulking.

A seventh filter paper 106 is disposed below the second plastic disk 104 and serves to distribute and slow water flow through the second housing member 22. Below the seventh filter paper 106 is a layer of mixed bed resin 108 containing pelletized catalytic charcoal 110. Such a mixed bed resin is manufactured by Rohm and Haas under the name Amberlite 160. The mixed bed resins utilized in the preferred embodiment of the present invention function by both anionic and cationic exchange to remove inorganic and organic contaminants such as lead, iron, cadmium, aluminum, zinc, mercury, chloroform, etc. The mixed bed resin additionally serves to remove other contaminants from water such as chlorides, nitrites, pesticides, sulfites, thalomethanes and radioactive substances such as radon, etc. The layer of mixed bed resin 108 contains both cation and anion exchange elements as well as catalytic charcoal 110. The catalytic charcoal removes any unwanted odor or taste from the water caused by the use of cation and anion exchange elements. Additionally, the catalytic charcoal 110 serves to remove unpleasant odor and taste caused by the layer of pentavalent iodine impregnated resin 96.

Disposed below the mixed bed resin 108 containing catalytic charcoal 310 is an eighth filter paper 112 for distributing water flowing therethrough and restricting the water flow rate. Below the eighth filter paper is disposed a second mixed bed layer containing cation and anion exchange elements and catalytic charcoal 114. This layer is identical to that disposed directly above the eighth filter paper 112 and serves the same ends thereof. Below the second mixed bed layer is a ninth filter paper 116 which serves to help distribute the water within the second housing portion 22 and to help slow water flow therethrough. A third mixed bed layer 118 identical to the two mixed bed layers disposed above, functions identically to the mixed bed layers disposed above it. Finally, a tenth filter paper 120 is disposed below the third mixed bed layer 118 and serves primarily to trap any particles of carbon that may have entered the water during the purification process.

Water then flows from the water purification apparatus through the downwardly extending spout 56 into the water collection tank 16 through the aperture 74 in the top 72 of the water collection tank 16. A user may then remove the water collection tank 16 from the water purification apparatus and utilize the water collection tank 16 as a pitcher for pouring water into an appropriate drinking apparatus such as glasses or mugs.

Water flows through the present apparatus 12 with a flow rate of between 0.20 and 0.025 gallons per minute. This ensures sufficient contact time between the water and the particulate layers to achieve adequate filtration of contaminants. Filter papers disposed within the water purification apparatus 12 help to restrict the flow of water and ensure sufficient contact time between the filtering and purifying layers within the apparatus 12 to ensure sufficient treatment of the water. The plastic discs placed within the apparatus function to disperse water flow within the housing, ensuring extended life of the apparatus. Each disc distributes the water, reducing channeling within each layer. Additionally, the positioning of a silver impregnated activated carbon layer above a layer of pentavalent iodine impregnated resin increases the life of the water treatment apparatus beyond that of other water treatment apparatuses on the market. As will be realized, the invention is capable of other and different embodiments and its several details are capable of modifications in various obvious respects, all without departing from the invention.

Having, thus, described the present invention, what is claimed is:

1. A water treatment apparatus, the apparatus discharging potable water therefrom, the apparatus comprising:
   (a) a first housing portion comprising:
      (i) a top surface, the top surface having a water inlet formed therein;
      (ii) a cylindrical sidewall integrally formed with the top surface and depending therefrom;
      (iii) a bottom surface integral with the sidewall and extending therefrom, the bottom surface having a recess formed therein, the recess having a plurality of holes formed therein the holes defining means for providing a long dwell time;
   (b) a second housing portion comprising: a tapered cylindrical side wall having an upper edge and terminating at a housing outlet;
   (c) means for detachably connecting the first housing portion and the second housing portion such that the recess of the first housing portion is housed within the second housing portion;
   (d) a plurality of distinct particulate layers within the first housing portion, the layers comprising;
      (i) a first layer comprising silver impregnated carbon;
      (ii) a second layer comprising activated carbon;
      (iii) a third layer comprising iodine resin;
      (iv) a fourth layer comprising a mixed bed layer of cation and anion resins the second layer is disposed intermediate the first layer and the third layer, at least one of the plurality of distinct particulate layers defining means for killing microbes;
   (e) a plurality of distinct particulate layers within the second housing portion, each of the plurality of distinct particulate layers defining means for removing organic, inorganic and radiological contaminants, at least one layer comprising a mixed bed of cation and anion exchange resin and catalytic carbon;
   (f) at least one porous separator disposed between each of the plurality of distinct particulate layers in the first housing portion and the second housing portion, the at least one porous separator removes impurities from water and regulates water flow through each of the plurality of distinct particulate layers; and
   wherein water flows into the water inlet, through each of the distinct particulate layers and through the at least one porous separator and exits at the housing outlet.

2. The water treatment apparatus of claim 1, wherein each of the plurality of distinct particulate layers within the second housing portion comprises: a mixed bed of anion and cation exchange resin and catalytic carbon.

* * * * *